(12) United States Patent
Facinelli et al.

(10) Patent No.: US 10,825,587 B2
(45) Date of Patent: Nov. 3, 2020

(54) WIRE AND CABLE JACKET COMPOSITION OF PA6/66 COPOLYMER BASE RESIN FOR IMPROVED PROCESSABILITY AND PROPERTIES

(71) Applicant: AdvanSix Resins & Chemicals LLC, Parsippany, NJ (US)

(72) Inventors: John V. Facinelli, Morristown, NJ (US); Xiaohan Zhou, Denville, NJ (US); Kuil Park, Midlothian, VA (US)

(73) Assignee: AdvanSix Resins & Chemicals LLC., Parsippany, NJ (US)

( * ) Notice: Subject to any disclaimer, the term of this patent is extended or adjusted under 35 U.S.C. 154(b) by 0 days.

(21) Appl. No.: 16/491,082

(22) PCT Filed: Mar. 10, 2018

(86) PCT No.: PCT/US2018/021894
§ 371 (c)(1),
(2) Date: Sep. 4, 2019

(87) PCT Pub. No.: WO2018/165641
PCT Pub. Date: Sep. 13, 2018

(65) Prior Publication Data
US 2020/0005970 A1    Jan. 2, 2020

Related U.S. Application Data

(60) Provisional application No. 62/469,595, filed on Mar. 10, 2017.

(51) Int. Cl.
*H01B 7/02* (2006.01)
*H01B 13/14* (2006.01)
(Continued)

(52) U.S. Cl.
CPC ......... *H01B 13/148* (2013.01); *C08G 69/14* (2013.01); *C08G 69/26* (2013.01); *C08L 77/02* (2013.01);
(Continued)

(58) Field of Classification Search
CPC . H01B 7/02; H01B 7/04; H01B 3/305; H01B 13/02; H01B 13/04; H01B 13/148;
(Continued)

(56) References Cited

U.S. PATENT DOCUMENTS 4,985,502 A * 1/1991 Izumi ................. C08L 23/02
524/528
5,028,662 A * 7/1991 Sezaki ................. C08L 11/00
525/194
(Continued)

FOREIGN PATENT DOCUMENTS

CN    1961386 B    5/2007
CN    102020842 B    4/2011
(Continued)

OTHER PUBLICATIONS

International Preliminary Report on Patentability issued in PCT/US2018/021894, dated Sep. 19, 2019, 8 pages.
(Continued)

*Primary Examiner* — William H. Mayo, III
(74) *Attorney, Agent, or Firm* — Faegre Drinker Biddle & Reath LLP (57) ABSTRACT

Polyamide compositions for use in forming wire or cable jacket compositions. The polyamide compositions include a component of polyamide 6/66 copolymer formed from substantially randomly distributed caprolactam monomers and hexamethylenediamine monomers. The polyamide 6/66 copolymer component may form the entirety of the polyamide composition or alternatively, the polyamide compo-
(Continued)

sition may include an amount of polyamide 6 homopolymer blended with the polyamide 6/66 copolymer component. The composition also includes one or more additives, such as at least one UV mitigation component, and the polyamide composition further has at least one of a measured transmittance of at least 70% and a measured haze of less than 60%, as determined by ASTM D1003.

19 Claims, 3 Drawing Sheets

(51) Int. Cl.
    *C08G 69/14*     (2006.01)
    *C08G 69/26*     (2006.01)
    *C08L 77/02*     (2006.01)
    *H01B 3/30*     (2006.01)

(52) U.S. Cl.
    CPC ........ *H01B 3/305* (2013.01); *C08L 2203/202* (2013.01)

(58) Field of Classification Search
    CPC ........ C08G 69/14; C08G 69/26; C08G 77/02; C08L 77/00; C08L 33/00; C08K 5/16; C08K 5/36
    USPC .............. 174/110 R–110 PM, 120 R–122 SR
    See application file for complete search history.

(56) References Cited

U.S. PATENT DOCUMENTS

| | | | |
|---|---|---|---|
| 5,324,588 A | 6/1994 | Rinehart et al. | |
| 6,515,058 B1 | 2/2003 | Tomiyama et al. | |
| 6,528,572 B1 | 3/2003 | Patel et al. | |
| 6,669,986 B1 | 12/2003 | Mushiake et al. | |
| 6,869,992 B2 | 3/2005 | Gugumus | |
| 7,186,767 B2 | 3/2007 | Seidel et al. | |
| 7,332,105 B2 | 2/2008 | Braig et al. | |
| 7,786,222 B2 | 8/2010 | Schmid et al. | |
| 7,902,287 B2 | 3/2011 | Grant et al. | |
| 8,138,243 B2 | 3/2012 | Bühler et al. | |
| 8,445,575 B2 | 5/2013 | Palmer et al. | |
| 8,518,302 B2 | 8/2013 | Gerster et al. | |
| 8,586,664 B2 | 11/2013 | Buhler et al. | |
| 8,658,757 B2 | 2/2014 | Uehira et al. | |
| 8,859,652 B2 | 10/2014 | Buehler et al. | |
| 8,889,767 B2 | 11/2014 | Weber et al. | |
| 9,095,189 B2 | 8/2015 | Malet | |
| 9,133,322 B2 | 9/2015 | Roth et al. | |
| 9,206,315 B2 | 12/2015 | Prusty et al. | |
| 9,312,047 B2 | 4/2016 | Facinelli et al. | |
| 9,328,218 B2 | 5/2016 | Schoening et al. | |
| 2010/0230134 A1* | 9/2010 | Chambers .............. | H01B 13/24 174/120 C |
| 2010/0255186 A1* | 10/2010 | Montes .................. | H01B 7/295 427/117 |
| 2011/0092622 A1* | 4/2011 | Kaneda .............. | C08K 5/34928 524/100 |
| 2011/0278062 A1 | 11/2011 | Varkey | |
| 2013/0168128 A1* | 7/2013 | Lopez-Gonzalez .... | H01B 3/305 174/120 C |
| 2013/0344236 A1* | 12/2013 | Facinelli ................ | C08L 77/00 427/118 |
| 2015/0037581 A1 | 2/2015 | Varkey et al. | |
| 2018/0105672 A1 | 4/2018 | Benighaus et al. | |
| 2019/0071568 A1 | 3/2019 | Gabriel et al. | |

FOREIGN PATENT DOCUMENTS

| | | | |
|---|---|---|---|
| CN | 103102684 B | 5/2013 | |
| CN | 103881372 A | 6/2014 | |
| CN | 104221095 A | 12/2014 | |
| CN | 109679332 A | 4/2019 | |
| DE | 102009008065 A1 | 8/2010 | |
| EP | 0 212 085 A2 * | 5/1986 | .............. C08L 77/00 |
| EP | 0212085 A2 | 3/1987 | |
| EP | 0704560 B1 | 4/1996 | |
| EP | 0970989 A1 | 1/2000 | |
| EP | 1574547 A1 | 9/2005 | |
| GB | 1513036 A | 6/1978 | |
| JP | S62236856 A | 10/1987 | |
| JP | 3226914 B2 | 9/1990 | |
| JP | 4560624 B2 | 5/2006 | |
| JP | 2010198898 A | 9/2010 | |
| KR | 100877392 B1 | 12/2008 | |
| WO | 2001014475 A1 | 3/2001 | |
| WO | 2007067538 A1 | 6/2007 | |
| WO | 2015055563 A1 | 4/2015 | |
| WO | 2019101851 A1 | 5/2019 | |

OTHER PUBLICATIONS

International Search Report and Written Opinion issued in PCT/US2018/021894, dated Jun. 6, 2018, 12 pages.

* cited by examiner

*FIG. 5*

WIRE AND CABLE JACKET COMPOSITION OF PA6/66 COPOLYMER BASE RESIN FOR IMPROVED PROCESSABILITY AND PROPERTIES

CROSS-REFERENCE TO RELATED APPLICATION

This application is a 371 National Stage application of International Application No. PCT/US2018/021894, filed Mar. 10, 2018, which claims priority to U.S. Provisional Application No. 62/469,595, filed Mar. 10, 2017, each of which is herein incorporated by reference in its entirety.

FIELD

The present disclosure relates to polyamide compositions suitable for wire and cable jacketing, and methods of producing such compositions.

BACKGROUND

A coating, or jacket, of polyamide is commonly provided on the outer surface of an underlying polyvinyl chloride ("PVC") coating on metallic wires and/or cables. The polyamide jacket provides oil resistance, abrasion resistance, and flexibility to the wire or cable product.

Polyamide formulations used in wire and cable jacketing typically include one or more polymers, along with additives such as heat stabilizers, lubricants, and other compounds. In a traditional approach, the entire formulation is compounded in a twin screw extruder to homogeneously incorporate each of the additives into formed polyamide pellets, which are then melted and extruded around the wire or cable to form the jacket.

Furthermore, for applications such as polyamide jacketing for building wire, the polyamide may be pigmented or, in some applications, highly transparent polyamide may be desired for allowing the color and/or printing of the underlying layers to be clearly visible through the polyamide. In applications in which the jacketing is exposed to sunlight, it is desired that the polyamide formulation is resistant to degradation which occurs due to UV-Vis radiation, particularly in the UV-B region.

However, additives such as those described above are typically immiscible in conventional polyamide compositions such that the compositions exhibit a loss of transparency and/or increase in haze upon incorporation of such additives, which adversely affects the desired transparency of the polyamide compositions when applied to an underlying wire or cable. Additionally, physical properties, such as tensile strength and elongation, may deteriorate upon exposure to sunlight if no UV mitigating additives are present.

What is needed is an improvement over the foregoing.

SUMMARY

The present disclosure provides polyamide compositions for use in forming wire or cable jacket compositions. The polyamide compositions include a component of polyamide 6/66 copolymer formed from substantially randomly distributed caprolactam monomers and hexamethylene diamine monomers. The polyamide 6/66 copolymer component may form the entirety of the polyamide composition or alternatively, the polyamide composition may include an amount of polyamide 6 homopolymer blended with the polyamide 6/66 copolymer component. The composition also includes one or more additives, such as at least one UV mitigation component which, due to the reduced crystallinity of the polyamide 6/66 copolymer component, is incorporated into the polyamide composition with desirable transmission and haze characteristics as well as providing for retention of physical properties such as tensile strength at break and elongation at break.

In one form thereof, the present disclosure provides a wire product, including a wire core; and a polyamide composition surrounding the core, the polyamide composition including a polyamide base resin including a caprolactam monomer component present in an amount between 75 and 99 wt. % and a hexamethylenediamine adipate monomer component present in an amount between 1 and 25 wt. %, based on the total weight of the polyamide base resin; at least one UV mitigation component present in an amount of between 0.1 and 6 wt. %, based on the total weight of the polyamide composition; and the polyamide composition further having at least one of a measured transmittance of at least 70%, as determined by ASTM D1003; and a measured haze of less than 60%, as determined by ASTM D1003.

The polyamide base resin of the wire product may include a caprolactam monomer component present in an amount between 90 and 97 wt. % and a hexamethylenediamine adipate monomer component present in an amount between 3 and 10 wt. %, based on the total weight of the polyamide base resin.

The polyamide composition of the wire product may have a measured transmittance of at least 85%, as determined by ASTM D1003. In the wire product, the polyamide composition, when formed into a molded plaque having dimensions of 60 mm width, 60 mm length, and 1.0 mm thickness, may have a measured haze of less than 30%, as determined by ASTM D1003. A portion of the polyamide composition of the wire product, when removed from the wire core, may have a measured haze of less than 50%, as determined by ASTM D1003.

The polyamide composition of the wire product may exhibit retention of tensile strength at break of at least 80%, following exposure to 720 hours of Xenon-Arc energy source under conditions specified by ASTM G155 cycle 1. The polyamide composition of the wire product may exhibit retention of elongation at break of at least 80%, following exposure to 720 hours of Xenon-Arc energy source under conditions specified by ASTM G155 cycle 1.

In the wire product, the at least one UV mitigation component may be a UV stabilizer or may be a UV absorber.

In another form thereof, the present invention provides a wire product, including a wire core; and a polyamide composition surrounding the core, the polyamide composition including a polyamide base resin including a polyamide copolymer of caprolactam monomers and hexamethylenediamine adipate monomers, the caprolactam monomers present in an amount between 75 and 99 wt. % and the hexamethylenediamine adipate monomers present in an amount between 1 and 25 wt. %, based on the total weight of the polyamide copolymer; at least one UV mitigation component present in an amount of between 0.1 and 6 wt. % based on the total weight of the polyamide composition; and the polyamide composition further having at least one of a measured transmittance of at least 70%, as determined by ASTM D1003; and a measured haze of less than 60%, as determined by ASTM D1003.

The polyamide base resin of the wire product may be a blend of the polyamide copolymer and a polyamide 6 homopolymer, the polyamide copolymer present in an amount between 5 and 90 wt. % and the polyamide 6 homopolymer present in an amount between 10 and 95 wt. %, based on the total weight of the polyamide base resin.

In the wire product, the caprolactam monomers may be present in an amount between 90 and 97 wt. % and the hexamethylenediamine adipate monomers present in an amount between 3 and 10 wt. %, based on the total weight of the polyamide copolymer.

The polyamide composition of the wire product may have a measured transmittance of at least 85%, as determined by ASTM D1003. The polyamide composition of the wire product, when formed into a molded plaque having dimensions of 60 mm width, 60 mm length, and 1.0 mm thickness, may have a measured haze of less than 30%, as determined by ASTM D1003. A portion of the polyamide composition of the wire product, when removed from the wire core, may have a measured haze of less than 50%, as determined by ASTM D1003.

The polyamide composition of the wire product may exhibit retention of tensile strength at break of at least 80%, following exposure to 720 hours of Xenon-Arc energy source under conditions specified by ASTM G155 cycle 1. The polyamide composition of the wire product may exhibit retention of elongation at break of at least 80%, following exposure to 720 hours of Xenon-Arc energy source under conditions specified by ASTM G155 cycle 1.

In the wire product, the at least one UV mitigation component may be a UV stabilizer or may be a UV absorber.

BRIEF DESCRIPTION OF THE DRAWINGS

The above mentioned and other features of the disclosure, and the manner of attaining them, will become more apparent and the disclosure itself will be better understood by reference to the following description of embodiments of the disclosure taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate one or more embodiment of the disclosure, and such exemplifications are not to be construed as limiting the scope of the disclosure in any manner.

DETAILED DESCRIPTION

The present disclosure provides polyamide compositions for use in forming wire or cable jacket compositions. The polyamide compositions include a component of polyamide 6/66 copolymer formed from substantially randomly distributed caprolactam monomers and hexamethylene diamine monomers. The polyamide 6/66 copolymer component may form the entirety of the polyamide composition or alternatively, the polyamide composition may include an amount of polyamide 6 homopolymer blended with the polyamide 6/66 copolymer component. The composition also includes one or more additives, such as at least one UV mitigation component which, due to the reduced crystallinity of the polyamide 6/66 copolymer component, is incorporated into the polyamide composition with desirable transmission and haze characteristics as well as providing for retention of physical properties such as tensile strength at break and elongation at break.

I. Background.

Although not so limited, the polyamide compositions described herein are particularly useful for the jacketing of wire and cable. As used herein, the term "wire product" encompasses any jacketed wire or cable product of the type described herein, such as individual wires, strands or groups of wires, cables, strands or groups of cables, or groups of the foregoing, such as composite articles formed of both wires and cables and the term "wire core" encompasses any substrate in the form of individual wires, strands or groups of wires, cables, strands or groups of cables, or groups of the foregoing, such as composite articles formed of both wires and cables.

Figure 1:
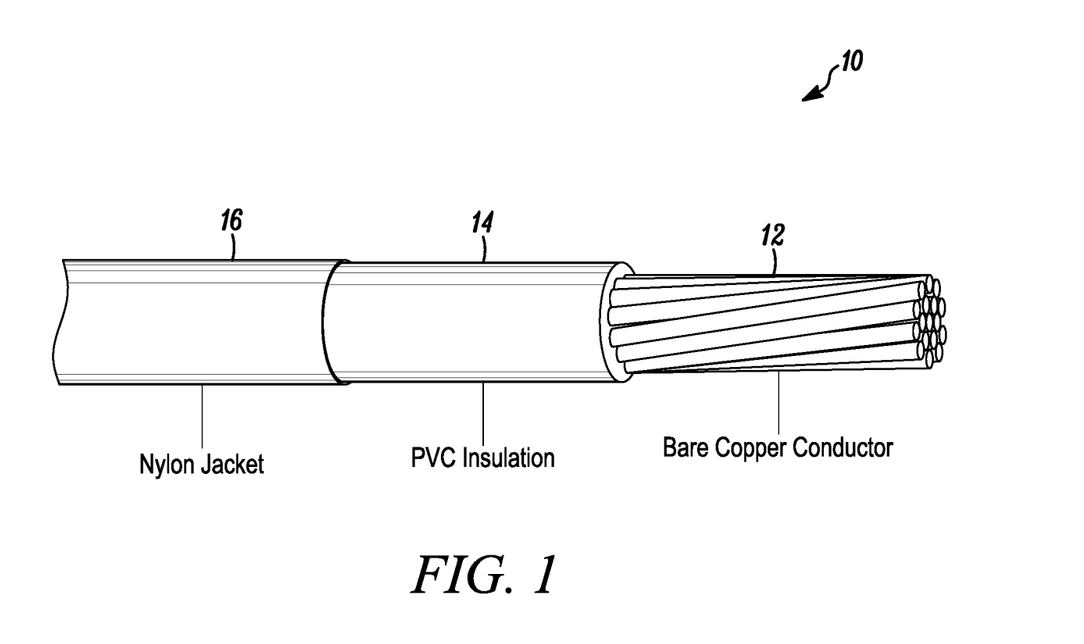
FIG. 1 illustrates an exemplary wire having PVC insulation and polyamide coatings.

An exemplary jacketed wire 10 is illustrated in FIG. 1. Wire 10 has a conductive core 12, typically of copper or a copper alloy, or aluminum, for example. As illustrated, core 12 is surrounded by a layer of insulation 14. An exemplary insulating material is a polyvinyl chloride ("PVC") based material including optional additives such as fillers, flame retardants, and lubricants, for example. Insulation layer 14 is further surrounded by an outer protective layer, illustratively polyamide jacket 16. In other embodiments, jacketed wire 10 does not include an additional insulating material and polyamide jacket 16 is in direct contact with the core 12. Desirable properties associated with polyamide jacket 16 include, among others, toughness, cracking resistance, transparency, smoothness, and processability for installing wire 10 as discussed herein.

Polyamide jacket 16 is formed from a compound comprising a plurality of additives incorporated into a polyamide composition. In one embodiment, polyamide jacket 16 is a polyamide composition including various target weight percentages of polyamide polymer(s) and additives, such as monomers, heat stabilizers, lubricants, anti-wear additives, and other suitable additives. Exemplary polymers include polyamide 6 or polycaprolactam, polyamide 66 or poly(hexamethylene adipamide), or as particularly described herein, polyamide 6/66 copolymer formed of monomers of caprolactam and hexamethylene adipamide.

II. Polyamide Base Resin.

The present polyamide compositions include a polyamide base resin or polyamide component including at least one polyamide polymer or alternatively, a blend of two or more polyamide polymers.

In one embodiment, the polyamide base resin is formed entirely of a polyamide 6/66 copolymer of caprolactam monomers and hexamethylene diamine adipate monomers, in which the caprolactam monomers are present in an amount of as little as 75 wt. %, 88 wt. %, or 90 wt. %, or as great as 95 wt. %, 97 wt. %, or 99 wt. %, or within any range defined between any two of the foregoing values, such as 75 to 99 wt. %, 88 to 97 wt. %, or 90 to 95 wt. %, for example, and the hexamethylene diamine adipate monomers are present in an amount of as little as 1 wt. %, 3 wt. %, or 5 wt. %, or as great as 10 wt. %, 12 wt. %, or 25 wt. %, or within any range defined between any two of the foregoing values, such as 1 to 25 wt. %, 3 to 12 wt. %, or 5 to 10 wt. %, for example, based on the total weight of the polyamide base resin.

In another embodiment, the polyamide base resin is formed as a blend of a polyamide 6/66 copolymer of caprolactam monomers and hexamethylene diamine adipate monomers and a polyamide 6 homopolymer of caprolactam monomers. The polyamide 6/66 copolymer of this blend may be the polyamide 6/66 copolymer described in the preceding paragraph. In this blend, the polyamide 6/66 copolymer may be present in an amount of as little as 5 wt. %, 10 wt. %, or 20 wt. %, or as great as 80 wt. %, 90 wt. %, or 100 wt. %, or within any range defined between any two of the foregoing values, such as 5 to 100 wt. %, 10 to 90 wt. %, or 20 to 80 wt. %, for example, and the polyamide 6 homopolymer may be present in an amount of as little as 0 wt. %, 10 wt. %, or 20 wt. %, or as great as 80 wt. %, 90 wt. %, or 95 wt. %, or within any range defined between any two of the foregoing values, such as 0 to 95 wt. %, 10 to 90 wt. %, or 20 to 80 wt. %, for example, based on the total weight of the polyamide base resin blend.

Therefore, stated otherwise, the base resin or polyamide component of the present polyamide compositions, regardless of whether same is formed entirely of a polyamide 6/66 copolymer or is in the form of a blend of a polyamide 6/66 copolymer and a polyamide 6 homopolymer, may be alternatively conceptualized as including a caprolactam monomer component and a hexamethylene diamine adipate monomer component, wherein the caprolactam monomer component is present in an amount of as little as 75 wt. %, 80 wt. %, or 85 wt. %, or as great as 95 wt. %, 97 wt. %, or 99 wt. %, or within any range defined between any two of the foregoing values, such as 75 to 99 wt. %, 80 to 97 wt. %, or 85 to 95 wt. %, for example, and the hexamethylene diamine adipate monomer component is present in an amount of as little as 1 wt. %, 3 wt. %, or 5 wt. %, or as great as 15 wt. %, 20 wt. %, or 25 wt. %, or within any range defined between any two of the foregoing values, such as 1 to 25 wt. %, 3 to 20 wt. %, or 5 to 15 wt. %, for example, based on the total weight of the base resin or polyamide component of the present polyamide composition.

To form the polyamide 6/66 copolymers, caprolactam and hexamethylenediamine adipate are blended together at elevated temperatures, for example as low as about 80° C., 100° C., 135° C., 145° C., 155° C., or 165° C., or as great as 170° C., 175° C., or 180° C., or within any range defined between any two of the foregoing values, such 150° C. to 170° C., or 155° C. to 180° C. for example. The caprolactam and hexamethylenediamine adipate may be mildly agitated during heating to provide more uniform heat transfer and mixing. The hexamethylenediamine adipate may be combined with the caprolactam as a dry powder, or may be combined with the caprolactam as an aqueous solution, such as an aqueous solution containing as little as about 30 wt. %, 40 wt. %, 50 wt. %, as great as 58 wt. %, 65 wt. % solids, or within any range defined between any two of the foregoing values, such 50 wt. % to 60 wt. % or 55 wt. % to 60 wt. %, for example. Further, particularly when hexamethylenediamine adipate is used as a dry powder, the caprolactam and hexamethylenediamine adipate may be blended in the presence of added water.

III. Additives.

The present polyamide compositions include one or more additives, such as polyamide monomers, heat stabilizers, lubricants, and anti-wear additives, for example. The present polyamide compositions may also include at least one ultraviolet (UV) mitigation component, which may be a UV stabilizer or a UV absorber, as described below.

Exemplary plasticizers that may be added as an additive include caprolactam monomers, cyclic and/or acyclic polyamide 6 oligomers, and N-butylbenzenesulfonamide. Any plasticizer additives, if present, may be present in an amount as little as 0.1 wt. %, 1 wt. %, or 2 wt. %, or as great as 4 wt. %, 6 wt. %, or 8 wt. %, or within any range defined between any two of the foregoing values, such as 0.1 to 8 wt. %, 1 to 6 wt. %, or 2 to 4 wt. %, for example, based on the total weight of the polyamide composition. The plasticizer additives function to impart flexibility to the polyamide composition during and after extrusion onto the core wire.

Exemplary heat stabilizers include one or more of copper iodide, potassium iodide, potassium bromide, sodium iodide, potassium chloride, other copper halides, and other metallic halides. Any heat stabilizers, if present, may be present in an amount as little as 0 wt. %, 0.25 wt. %, or 1 wt. %, or as great as 2 wt. %, 2.5 wt. %, or 3 wt. %, or within any range defined between any two of the foregoing values, such as 0.25 to 3 wt. %, 0.75 to 2.5 wt. %, or 1 to 2 wt. %, for example, based on the total weight of the polyamide composition. The heat stabilizer functions to inhibit oxidative degradation of the polyamide resulting from presence of oxygen at higher temperatures by interfering with cyclic oxidative degradation free radical degradation processes. The heat stabilizer can also function to aid in preventing UV degradation, discussed below.

Exemplary lubricants include one or more of ethylene bis stearamide ("EBS"), other organic amides, aluminum stearate, zinc stearate, calcium stearate, other metallic stearates, and other metallic fatty acids. Any lubricants, if present, may be present in an amount as little as 0.5 wt. %, 0.75 wt. %, or 1 wt. %, or as great as 2 wt. %, 2.5 wt. %, or 3 wt. %, or within any range defined between any two of the foregoing values, such as 0.5 to 3 wt. %, 0.75 to 2.5 wt. %, or 1 to 2 wt. %, for example, based on the total weight of the polyamide composition. The lubricants act to improve extrusion processability by decreasing the torque variation of single screw extruder and also decreasing power required to operate the screw. The lubricants also provide an attractive glossy surface appearance after the nylon coating is extruded on the wire core and insulation.

Exemplary anti-wear additives include one or more of perfluoropolyether, polytetrafluoroethylene, functional and non-functional polydimethylsiloxane, graphite, molybdenum disulfide, and silicone oil. Other suitable additives may also be used. Any anti-wear additives, if present, may be present in an amount as little as 0.5 wt. %, 0.75 wt. %, or 1 wt. %, or as great as 2 wt. %, 3 wt. %, or 5 wt. %, or within any range defined between any two of the foregoing values, such as 0.5 to 5 wt. %, 0.75 to 3 wt. %, or 1 to 2 wt. %, for example, based on the total weight of the polyamide composition. The anti-wear additives provide tribological benefits to the surface of the wire or cable jacket to enable same to withstand abrasion and potential physical contact damage.

The present polyamide compositions may also include at least one ultraviolet (UV) mitigation component, which may be a UV stabilizer or a UV absorber, or a combination of the foregoing. Generally, UV stabilizers function to quench free radicals which are generated upon exposure of the polyamide composition to UV radiation, while UV absorbers function to absorb UV radiation and release same as heat in order to prevent the formation of free radicals within the polyamide composition.

Exemplary UV stabilizers may include a hindered amine light stabilizer (HALS) having the general formula (I) shown below where $R_1$ is bonded to nitrogen and is either an alkyl group or a hydrogen atom, each of $R_2$, $R_3$, $R_5$, $R_6$ may be a hydrogen atom or an alkyl group, and $R_4$ may be a hydrogen atom, an alkyl group, or a functional group including amide, ester, or ether. In the foregoing, the alkyl groups may be $C_1$-$C_6$ alkyl, including methyl, ethyl, isopropyl, and tert-butyl, for example.

(I)

Other exemplary UV stabilizers include, N,N'-Bis-2,2,6,6-tetramethyl-4-piperidinyl-1,3-benzene dicarboxamide, 2,2,6,6-tetramethyl-4-piperidyl, and 1,2,2,6,6-pentamethyl-4-piperidyl, for example, and may be miscible with the polyamide composition of polyamide jacket 16 (discussed below) by providing favorable free energy of mixing through strong molecular specific interaction and low molecular weight.

Also, stabilizers with UV absorption that matches with the activation spectra maxima of the polyamide composition also have a high efficacy for UV stabilization. In an exemplary embodiment, Nylostab SEED (1,3-benzenedicarboxamide, N1,N3-bis(2,2,6,6-tetramethyl-4-piperidinyl)-, CAS NO. 42774-15-2) manufactured by Clariant Corporation, is used as a UV stabilizer.

Exemplary UV absorbers include hydroxybenzophenone, hydroxyphenylbenzotriazole, and oxanilides such as 2-ethyl-2'-ethoxy-oxalanilide.

Any UV mitigation components, if present, may be present in an amount as little as 0.1 wt. %, 0.5 wt. %, or 1 wt. %, or as great as 2 wt. %, 4 wt. %, or 6 wt. %, or within any range defined between any two of the foregoing values, such as 0.1 to 6 wt. %, 0.5 to 4 wt. %, or 1 to 2 wt. %, for example, based on the total weight of the polyamide composition.

IV. Properties of the Polyamide Compositions.

In some embodiments, the polyamide composition has a relatively low crystallization rate during or after extrusion as compared to a polyamide 6 homopolymer as measured by Differential Scanning calorimetry (DSC) using an isothermal crystallization method. In particular, the polyamide composition may have a peak isothermal crystallization time as short as 1.5 minutes, 3 minutes, 4.5 minutes, or as long as 6 minutes, 7.5 minutes, 9 minutes, or within any range defined between any two of the foregoing values, such as 1.5 minutes to 9 minutes, for example.

A relatively low crystallization rate during or after extrusion of the polyamide composition yields improved smoothness of the surface of the resulting polyamide wire or cable jacket relative to a polyamide 6 homopolymer. In particular, the polyamide composition may have a surface roughness ($R_A$), based on a surface profile measurement with a profilometer according to ISO4287, of as low as 2, 20, or 40, or as high as 50, 70, or 90 micrometer, or within any range defined between any two of the foregoing values, such as 2 to 90, 10 to 80, or 30 to 60 micrometer, for example.

In some embodiments, the polyamide composition has a relatively low crystallization temperature measured by Differential Scanning calorimetry (DSC), cooling at 10° C./minute and measuring crystallization temperature upon cooling when compared to a polyamide 6 homopolymer. In particular, the polyamide composition may have a crystallization temperature as low as 130° C., 140° C., or 150° C., as high as 160° C., 170° C., or 180° C., or within any range defined between any two of the foregoing values, such as 140° C. to 170° C., or 150° C. to 160° C., for example.

A relatively low crystallization temperature for the copolyamide composition also yields improved processability of polyamide wire or cable jacket relative to a polyamide 6 homopolymer by increasing the temperature processing window for extrusion coating operation of the polyamide wire or cable jacket over typical cable insulation materials such as PVC or cross-linked polyethylene. In particular, the polyamide composition may have a temperature processing window of as low as 190° C., 210° C., 225° C., or 240° C., or as high as 270° C., 280° C., or 290° C., or within any range defined between any two of the foregoing values, such as 190° C. to 290° C., 210° C. to 280° C., or 225° C. to 270° C., for example.

A polyamide with a relatively low crystallinity yields improved transparency in the extruded polyamide wire or cable jacket relative to a wire or cable jacket consisting of a polyamide 6 homopolymer. The improved transparency can allow for elimination of the color pigment in polyamide jacket 16 by utilizing color pigment in PVC layer 14.

In particular, polyamide compositions according to the present disclosure may have a transmittance determined by using a BYK-Gardner haze-gard according to ASTM standard D 1003. In one embodiment, transmittance is measured by preparing a molded plaque of 60 mm width×60 mm length×1 mm thickness by melting the polyamide at 260° C. and molding using molds at a temperature of 38° C. In another embodiment, transmittance is measured by removing the polyamide composition from a wire or cable onto which same has been extruded. The measured transmittance may be as high as, or higher than, each of 20%, 40%, or 60%, or as high as, or higher than, each of 70%, 80%, or 90%, and up to and including 100%, or within any range defined between any two of the foregoing values, such as 20% to 100%, 40% to 80%, or 60% to 70%, for example.

Also, extruded and applied polyamide compositions according to the present disclosure may have a measured haze, also determined by using a BYK-Gardner haze-gard according to ASTM standard D 1003. In one embodiment, haze is measured through a molded plaque of 60 mm width×60 mm length×1 mm thickness by melting the polyamide at 260° C. and molding using molds at a temperature of 38° C. In another embodiment, haze is measured directly through the polyamide jacket by removing the polyamide composition from a wire or cable onto which same has been extruded. The measured haze may be approaching or as low as 0%, or as low as, or lower than, each of 5%, 10%, or 30%, or as low as, or lower than, each of 40%, 50%, or 60%, or within any range defined between any two of the foregoing values, such as 0% to 60%, 5% to 50%, or 10% to 40%, for example.

In general, low values of haze and high values of transmittance are indicative of greater transparency.

Due to the relatively slower crystallization rate and the reduced overall crystallinity, the present polyamide composition, when used to form polyamide wire or cable jacket 16, exhibit improved toughness relative to a wire or cable jacket consisting of a polyamide 6 homopolymer. The improved toughness reduces cracking in certain environments such as during the dry and cool winter months.

The present polyamide 6/66 copolymers may have a solution viscosity of as little as about 45 formic acid viscosity ("FAV"), 50 FAV, 55 FAV, or as high as 60 FAV, 65

FAV, 70 FAV, or within any range defined between any two of the foregoing values, such as 45 to 70, 50 to 65, or 55 to 60, for example, as determined by ASTM D789.

The present polyamide 6/66 copolymers may be unterminated or may have single or dual end-group termination with an extractable content of monomers or oligomers based on polyamide 6 ("extractable content") of as little as about 0.1 wt. %, 1 wt. %, 1.5 wt. %, or 2 wt. %, or as great as 2.5 wt. %, 3 wt. %, 3.5 wt. %, 4 wt. %, or 5 wt. %, or within any range defined between any two of the foregoing values, such as 0.1 wt. % to 5 wt. %, 1 wt. % to 4 wt. %, 1.5 wt. % to 3.5 wt. %, or 2 wt. % to 2.5 wt. %, for example, as determined by ISO 6427.

An exemplary polyamide 6/66 copolymer according to the present disclosure may have a solution viscosity of as little as 30 FAV, 40 FAV, or 50 FAV, or as high as 54 FAV, 55 FAV, 65 FAV, or 75 FAV, or within any range defined between any two of the foregoing values, unterminated endgroups, and an extractable content of as little as about 0.1 wt. %, 0.5 wt. %, 1 wt. %, or 1.5 wt. %, or as great as 3 wt. %, 4 wt. %, or 5 wt. %, or within any range defined between any two of the foregoing values.

Advantageously, the present polyamide compositions, after compounding and extrusion as discussed below, are able to retain desired mechanical properties following exposure and retention tests when subjected to UV radiation.

The present polyamide compositions may exhibit retention of tensile strength at break of at least 80%, following exposure to 720 hours of Xenon-Arc energy source under conditions specified by ASTM G155 cycle 1. In other embodiments, the retention of tensile strength at break may be at least 85%, at least 90%, or at least 95%, for example, up to 100%.

The present polyamide compositions may exhibit retention of elongation at break of at least 80%, following exposure to 720 hours of Xenon-Arc energy source under conditions specified by ASTM G155 cycle 1. In other embodiments, the retention of elongation at break may be at least 85%, at least 90%, or at least 95%, for example, up to 100%.

Conditions for evaluating the foregoing mechanical properties are set forth in Example 3 herein.

V. Methods of Forming Polyamide Compositions.

Figure 2:
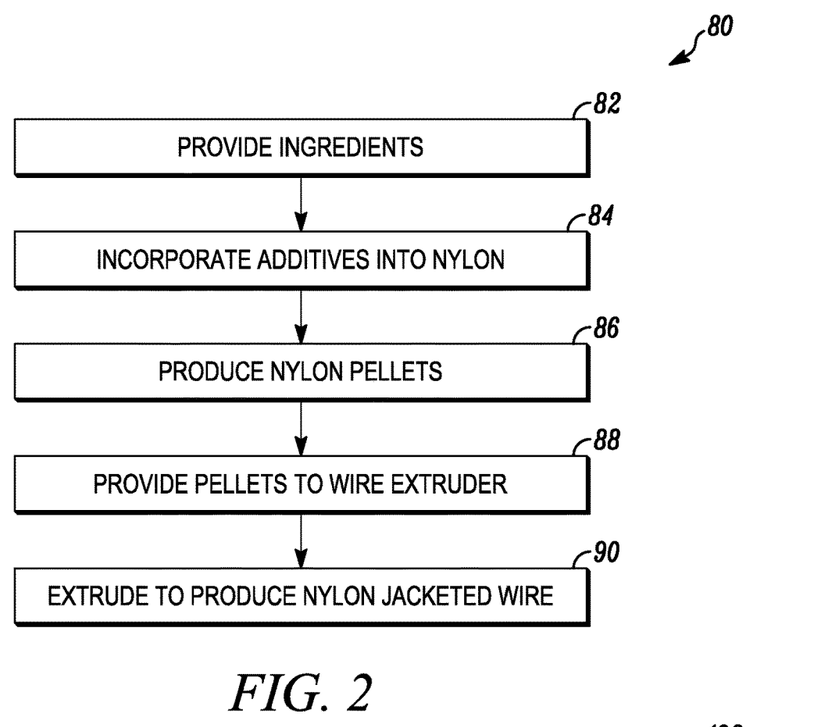
FIG. 2 illustrates an exemplary method of producing polyamide jacketed wire.

FIG. 2 illustrates an exemplary method 80 of producing polyamide jacketed wire. In step 82, the ingredients to be combined into the desired formulation are provided. Some of the polyamide may be provided in a ground powder form to assist in the transport and dispersing of the additives, such as UV stabilizers for example, in the mixing process. In one embodiment, about 1% by weight of the overall formulation is provided as ground polyamide. In step 84, the ingredients are incorporated into the polymer at a temperature at or above the melt point of the polyamide composition. In one exemplary embodiment, the melt point of polyamide composition is about 220° C. In other embodiments, the melt point may be as low as about 180° C., 190° C., or 200° C., or as high as 210° C., 215° C., or 220° C., or within any range defined between any two of the foregoing values, such as 180° C. to 220° C., 190° C. to 215° C., or 200° C. to 210° C., for example.

Incorporating the additives into the polyamide composition in this manner provides a more uniform mix and a more homogenous polymer compound. In other words, complete homogenous mixing of the additives with polyamide composition is achieved by the incorporation of additives via the methods disclosed herein, which enables the final compositions to yield improved properties. In one embodiment, step 84 is performed in a twin screw extruder or mixer. In another embodiment, step 84 is performed in a single screw extruder or mixer. Other suitable methods of incorporating the additives into the polyamide composition include but are not limited to the use of Brabender mixers, rollers, kneaders, and mills. In one embodiment, additives such as UV stabilizers may be incorporated into the polymer via in situ addition during polymerization. In an alternate embodiment, additives may be incorporated by melt extrusion (FIG. 3) using a single screw extruder with mixing elements. In a further alternate embodiment, additives may be incorporated by melt extrusion (FIG. 3) utilizing flow past static mixer. In yet another embodiment, additives may be incorporated by coating polyamide pellets with the additives followed by extrusion.

Once the additives have been incorporated into the polyamide composition, the formulation is then converted into pellets in step 86. In step 88, the pellets are provided to an extruder used to produce the jacketed wire. In step 90, the pellets are extruded through a die to form a polyamide jacket surrounding the conductive core of the jacketed wire. In embodiments in which an insulating layer is also be coated on the conducting core, the polyamide jacket is formed outside the insulating layer, as illustrated in FIG. 1.

Figure 3:
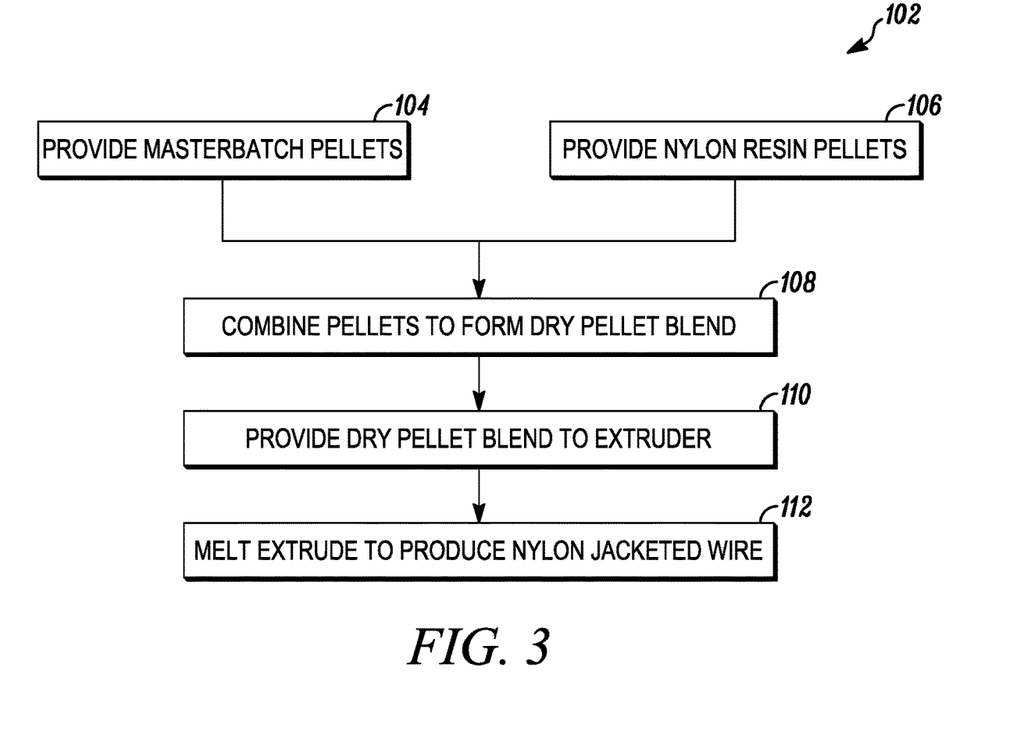
FIG. 3 illustrates another exemplary method of producing polyamide jacketed wire.

FIG. 3 illustrates another exemplary method 102 of producing polyamide jacketed wire. In step 104, a masterbatch compound of the polyamide composition in pellet form is provided. The masterbatch compound contains a higher loading of at least one additive (e.g., the UV stabilizer) compared to the desired final formulation. Exemplary methods of producing a masterbatch are described in more detail below with respect to FIGS. 4 and 5. In one embodiment, step 104 comprises providing a first plurality of masterbatch pellets including a portion, or all, of the polyamide composition and a first additive and a second plurality of masterbatch pellets including a portion, or all, of the polyamide composition and a second additive. In step 106, a polyamide composition is also provided in pellet form. In one embodiment, the polyamide composition provided in step 106 and the polyamide composition provided in step 122 of method 120 (FIG. 4) or step 142 of method 140 (FIG. 5) are the same polyamide composition or derived from the same manufacturing process. In one embodiment, the polyamide composition provided in step 106 and the polyamide composition provided in step 122 or 142 are identical (e.g., polyamide 6/6,6). As used herein, two polymers are identical if they have the same chemical properties such as the same viscosity and the same extractable content.

In step 108, the masterbatch pellets provided in step 104 and the polyamide resin pellets provided in step 106 are combined. In step 110, the pellets are provided to the extruder. In one embodiment, steps 108 and 110 are performed as a single step. In this embodiment, the masterbatch pellets and polyamide resin pellets are directly provided to the extruder. In another embodiment, steps 108 and 110 are performed as separate steps. In this embodiment, the masterbatch pellets and polyamide resin pellets are combined to form a dry pellet blend, and the dry pellet blend is directly provided to the extruder. In one embodiment, the dry pellet blend is mixed or dispersed to increase the homogeneity of the blend between the masterbatch pellets and the polyamide resin pellets.

In step 112, the combined pellets are extruded into a polyamide jacket covering the outside of a polyamide jacketed wire, such as illustrated in FIG. 1.

In one embodiment, the method 102 illustrated in FIG. 3 produces a polyamide jacket 16 in step 112 that has a reduced heat history compared to a polyamide jacket 16 produced in step 90 of method 80 illustrated in FIG. 2. Referring to FIG. 2, all of the polyamide composition in the final polyamide jacket 16 has been heated above its melting point at least twice, once in step 84 to incorporate the additives into the polyamide composition, and again in step 90 when forming the polyamide jacket 16. In comparison, referring to FIG. 3, the portion of polyamide composition provided as polyamide pellets in step 106 is only heated once, namely, during the formation of the polyamide jacket embodiment, step 130 is performed in a single screw extruder or mixer. Other suitable ways of incorporating the additives into the polymer, including but not limited to Brabender mixers, rollers, kneaders, and mills, may also be used. In one embodiment, the masterbatch is combined at a temperature slightly above the melt temperature of the polyamide base resin with a single screw or twin screw extruder. In step 132, the masterbatch produced in step 130 is pelletized.

Exemplary Masterbatch Formulations

| Ingredient | Target A | A20% | A10% | Target B | B20% | B10% |
|---|---|---|---|---|---|---|
| Polyamide composition | 96.58 | 82.90 | 65.88 | 96.62 | 83.10 | 66.20 |
| Caprolactam | 1.80 | 9.00 | 18.00 | 2.80 | 14.00 | 28.00 |
| Heat stabilizers | 1.09 | 5.70 | 10.90 | 0.28 | 1.40 | 2.80 |
| Lubricants | 0.53 | 2.65 | 5.30 | 0.30 | 1.50 | 3.00 |
| Total % | 100 | 100 | 100 | 100 | 100 | 100 |

16, while only the portion provided as masterbatch in step 104 has been previously heated. In an exemplary blend of 20% masterbatch to 80% raw polyamide, 20% of the polyamide has been heated twice, while 80% of the polyamide composition has been heated only once. In this manner, the embodiment of FIG. 3 may be advantageous, as repeated heating and cooling of the polyamide polymer may produce different polymer and crystalline properties, resulting in different properties in the final polyamide jacket 16.

Figure 4:
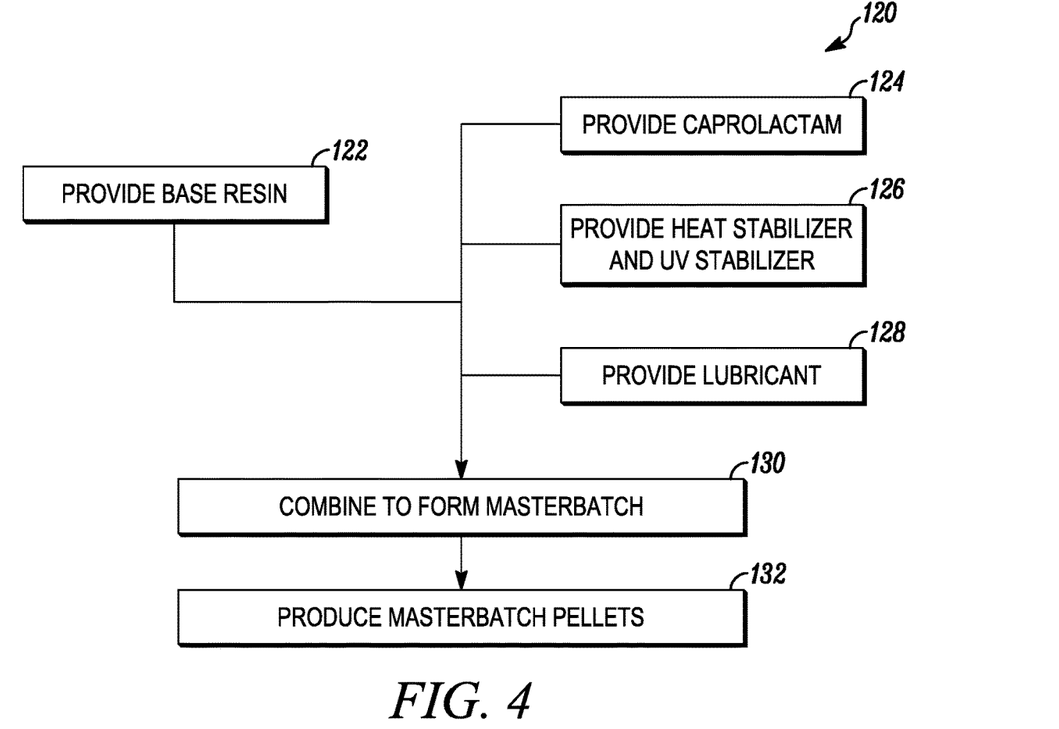
FIG. 4 illustrates an exemplary method of producing a polyamide masterbatch.

FIG. 4 illustrates an exemplary method 120 of producing masterbatch pellets. In step 122 a base resin is provided in the form of the present polyamide composition.

In one embodiment, the base resin provided in step 122 and the base resin provided in step 106 of method 102 (FIG. 3) are an identical grade of polyamide composition or derived from the same manufacturing process. Some of the polyamide may be provided in a ground powder form to assist in the transport and dispersing of the additives in the mixing process. In one embodiment, the weight percent of polyamide provided as ground polyamide is about the weight percent of the caprolactam provided.

In step 124, additional monomer is provided. An exemplary monomer is caprolactam. In an exemplary embodiment, the quantity of monomer provided in step 124 is from as little as 8 wt. %, 9 wt. %, 10 wt. %, 11 wt. %, 12 wt. %, or 13 wt. %, or as great as 14 wt. %, 15 wt. %, 16 wt. %, 17 wt. %, or 18 wt. %, of the desired masterbatch by weight, or within a range defined between any two of the foregoing values.

In step 126, one or more heat stabilizing ingredients are provided. Exemplary heat stabilizers include one or more of copper iodide, potassium iodide, potassium bromide, sodium iodide, potassium chloride, other copper halides, and other metallic halides. In an exemplary embodiment, UV stabilizers are added with the heat stabilizers in step 126. Exemplary UV stabilizers include on or more of N,N'-Bis-2,2,6,6-tetramethyl-4-piperidinyl-1,3-benzene dicarboxamide; 2,2,6,6-tetramethyl-4-piperidyl; 1,2,2,6,6-pentamethyl-4-piperidyl, and UVA. In step 128, one or more lubricants are provided. Exemplary lubricants include one or more of ethylene bis stearamide ("EBS"), other organic amides, aluminum stearate, zinc stearate, calcium stearate, and other metallic stearates.

In step 130, the ingredients provided in steps 122, 124, 126, and 128 are combined. In one embodiment, step 130 is performed in a twin screw extruder or mixer. In another Exemplary masterbatch formulations are provided in Table 1. The masterbatch formulations A20% and B20% include five times the additives as the formulations Target A and Target B. When the masterbatch formulations A20% and B20% are incorporated with additional polyamide composition in a weight ratio of 20% masterbatch to 80% polyamide resin, the resulting compound will include the same levels of the additives caprolactam, heat stabilizers, and lubricants as the formulations Target A and Target B. Similarly, the masterbatch formulations A10% and B10% include five times the additives as the formulations Target A and Target B. When the masterbatch formulations A10% and B10% are incorporated with additional polyamide composition in a weight ratio of 10% masterbatch to 90% polyamide resin, the resulting compound will include the same levels of the additives caprolactam, heat stabilizers, and lubricants as the formulations Target A and Target B.

In one embodiment, the masterbatch and polyamide composition may be combined in a weight ratio of masterbatch to polyamide resin as little as 2:1, 1:1, 1:2, 3:1, 4:1, 5:1 as great as 9:1, 10:1:19:1, 20:1, 24:1, 25:1, or within any range defined between any two of the foregoing values.

In one embodiment, based on the desired target and masterbatch loading, the masterbatch compound may include one or more additives in an amount as little as 0.10 wt. %, 0.30 wt. %, 1 wt. %, or 5 wt %, or as great as 10 wt. %, 15 wt. %, 20 wt. %, 25 wt. %, 30 wt. %, 33 wt. %, 30 wt. % or 50 wt. %, or within any range defined between any two of the foregoing values, based on the total weight of the masterbatch. The polyamide resin may be present in an amount as little as 50 wt. %, 60 wt. %, 70 wt. %, or as great as 75 wt. %, 80 wt. %, 90 wt. %, 95 wt. %, or 99 wt. %, or within any range defined between any two of the foregoing values based on the total weight of the masterbatch.

Figure 5:
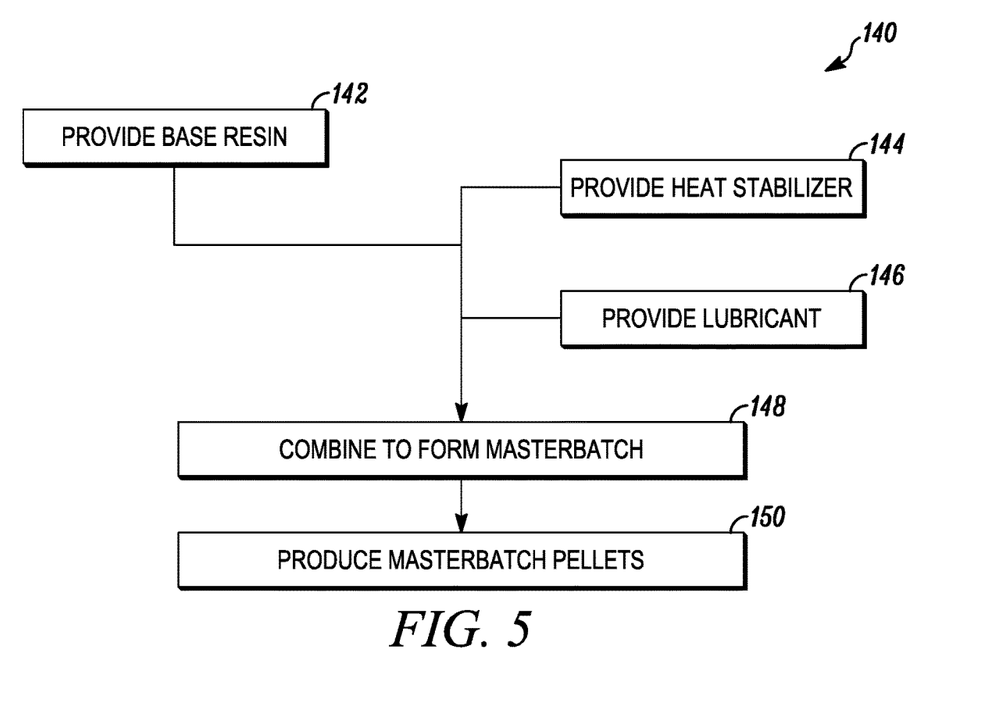
FIG. 5 illustrates another exemplary method of producing a polyamide masterbatch.

In one embodiment, the additives may be provided in a form consisting essentially of the additive. In another embodiment, the additive may be provided as part of a mixture comprising the additive and a polyamide resin. In one embodiment, the mixture is incorporated into the masterbatch, as illustrated in step 130 (FIG. 4) or step 148 (FIG. 5). In another embodiment, the mixture is provided as a second masterbatch and added to a first masterbatch and polyamide resin pellets in step 108 (FIG. 3) to achieve a desired final concentration of the additive.

The masterbatch compound may include one or more heat stabilizers. Exemplary heat stabilizers include one or more of copper iodide, potassium iodide, potassium bromide, sodium iodide, potassium chloride, other copper halides, and other metallic halides. The masterbatch compound may include one or more heat stabilizers in a total amount as little as 0 wt. %, 0.1 wt. %, 0.3 wt. %, 0.5 wt. %, 1 wt. %, 1.5 wt. %, 2 wt. %, 2.5 wt. %, 3 wt. %, 4 wt. %, as great as 5 wt. %, 6 wt. %, 7 wt. %, 8 wt. %, 9 wt. %, 10 wt. %, 11 wt. %, 12 wt. %, or within any range defined between any two of the foregoing values, based on the total weight of the masterbatch.

In one embodiment, the masterbatch compound may include one or more lubricants. Exemplary lubricants include one or more of ethylene bis stearamide ("EBS"), other organic amides, aluminum stearate, zinc stearate, calcium stearate, other metallic stearates, and other metallic fatty acids. The masterbatch compound may include one or more lubricants in a total amount as little as 0 wt. %, 0.1 wt. %, 0.3 wt. %, 0.5 wt. %, 1 wt. %, 1.3 wt. %, 1.5 wt. %, 2 wt. %, 2.5 wt. %, as great as 3 wt. %, 4 wt. %, 5 wt. %, 6 wt. %, 7 wt. %, 8 wt. %, or within any range defined between any two of the foregoing values, based on the total weight of the masterbatch.

In one embodiment, the masterbatch compound may include one or more monomers such as caprolactam or other suitable monomers in a total amount as little as 0 wt. %, 0.5 wt. %, 1 wt. %, 2 wt. %, 5 wt. %, 10 wt. %, 11 wt. %, as great as 15 wt. %, 16 wt. %, 20 wt. %, 25 wt. %, 30 wt. %, or within any range defined between any two of the foregoing values, based on the total weight of the masterbatch.

In one embodiment, the masterbatch compound may include one or more anti-wear additives. Exemplary lubricants include perfluoropolyether, polytetrafluoroethylene, functional and non-functional polydimethylsiloxane, graphite, molybdenum disulfide, and silicone oil. The masterbatch compound may include one or more anti-wear additives in a total amount as little as 0 wt. %, 0.1 wt. %, 0.3 wt. %, 0.5 wt. %, 1 wt. %, 1.5 wt. %, 2 wt. %, 2.5 wt. %, as great as 3 wt. %, 4 wt. %, 5 wt. % or within any range defined between any two of the foregoing values, based on the total weight of the masterbatch.

In one embodiment, the masterbatch produced in method 120 is provided as masterbatch pellets in step 104 of method 102. In an exemplary embodiment, the masterbatch pellets provided in step 104 are from about 5% to about 20% by weight of the desired dry pellet blend weight and the polyamide resin pellets provided in step 106 are from about 95% to about 80% by weight the desired dry pellet blend weight. In one embodiment, the masterbatch pellets provided in step 104 are present in an amount of as little as 5% by weight, 10% by weight, or 15% by weight, or as great as 20% by weight, 25% by weight, 33% by weight, or 50% by weight, of the desired dry pellet blend weight or within a range defined between any pair of the foregoing values, with the polyamide resin pellets comprising the remainder desired dry pellet blend weight.

FIG. 5 illustrates another exemplary method 140 of producing masterbatch. In step 142 a base resin is provided in the form of the present polyamide composition. In one embodiment, the base resin provided in step 142 and the base resin provided in step 106 of method 102 (FIG. 3) are an identical grade of polymer or derived from the same manufacturing process. Some of the polyamide composition may be provided in a ground powder form to assist in the transport and dispersing of the additives in the mixing process. In one embodiment, the weight percent of polyamide composition provided as ground polyamide is about the weight percent of the additives provided.

In step 144, one or more heat stabilizing ingredients are provided. Exemplary heat stabilizers include copper iodide and potassium iodide. In step 146, one or more lubricants are provided. Exemplary lubricants include EBS and aluminum stearate. In step 148, the ingredients provided in steps 142, 144, and 146 are combined. In one embodiment, step 148 is performed in a twin screw extruder or mixer. In another embodiment, step 148 is performed in a single screw extruder or mixer. Other suitable ways of incorporating the additives into the polymer, including but not limited to Brabender mixers, rollers, kneaders, and mills, may also be used. In one embodiment, the masterbatch is combined at a temperature slightly above the melt temperature of the polyamide base resin with a single screw or twin screw extruder. In step 150, the masterbatch produced in step 148 is pelletized.

In one embodiment, the masterbatch produced in method 140 is provided as masterbatch pellets in step 104 of method 102. In an exemplary embodiment, the masterbatch pellets provided in step 104 are from about 5% to about 20% by weight of the desired dry pellet blend weight and the polyamide resin pellets provided in step 106 are from about 95% to about 80% by weight of the desired dry pellet blend weight.

In one embodiment, the polyamide resin pellets provided in step 106 of method 102 comprise the same polyamide resin as provided in step 122 of method 120. In another embodiment, the polyamide resin pellets provided in step 106 of method 102 comprise the same polyamide resin as provided in step 142 of method 140.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

The following non-limiting Example illustrate various features and characteristics of the present disclosure, which is not to be construed as limited thereto.

Example 1

Exemplary Polyamide Compositions

In this Example, exemplary polyamide compositions were prepared. Polyamide formulations were prepared by compounding the composition ingredients using a Leistritz 18 mm or 27 mm (screw diameter) co-rotating twin screw extruder. Typical screw speed was 200 rpm. Extruder heating zones (zone 1 through zone 6) were controlled to achieve a polyamide melt temperature exiting the extruder of 250-270° C. Throughput for the 18 mm extruder was 7 lb/hr. Throughput for the 27 mm extruder was 20-30 lb/hr. Prior to extrusion, polyamide materials were dried at 70° C. in a vacuum oven for 24 hours to remove residual moisture. Feeding of additives was accomplished with 2 feeders, one feeder for the polyamide base resin (or base resin blend) and one feeder for the additives. A small quantity of ground polyamide 6 homopolymer additive was blended with the other additives to disperse the additives uniformly and to facilitate feeding. Extruded strands were cooled in a water bath prior to pelletization.

The polyamide compositions are set forth in Tables 1A and 1B below:

TABLE 1A

Exemplary polyamide compositions - polyamide components

| PA Comp. | PA 6 Homopolymer (wt. %) | PA 6/66 Copolymer (Components) (wt. %) | Total Content of Capro/HA |
|---|---|---|---|
| PA 1 | 97.33 | 0 | 100/0 |
| PA 2 | 97.54 | 0 | 100/0 |
| PA 3 | 97.18 | 0 | 100/0 |
| PA 4 | 97.44 | 0 | 100/0 |
| PA 5 | 91.54 | 0 (this composition also included 6 wt. % amorphous polyamide) | 100/0 |
| PA 6 | 79.54 | 18.0 (81.0 Capro/19.0 HA) | 96.6/3.4 |
| PA 7 | 97.81 | 0 | 100/0 |
| PA 8 | 80.51 | 18.0 (81.0 Capro/19.0 HA) | 96.6/3.4 |
| PA 9 | 80.21 | 18.0 (81.0 Capro/19.0 HA) | 96.6/3.4 |
| PA 10 | 79.91 | 18.0 (81.0 Capro/19.0 HA) | 96.6/3.4 |
| PA 11 | 80.71 | 18.0 (81.0 Capro/19.0 HA) | 96.6/3.4 |
| PA 12 | 80.41 | 18.0 (81.0 Capro/19.0 HA) | 96.6/3.4 |
| PA 13 | 80.11 | 18.0 (81.0 Capro/19.0 HA) | 96.6/3.4 |
| PA 14 | 48.71 | 50.0 (93.0 Capro/7.0 HA) | 96.5/3.5 |
| PA 15 | 99.51 | 0 | 100/0 |
| PA 16 | 99.61 | 0 | 100/0 |
| PA 17 | 98.31 | 0 | 100/0 |
| PA 18 | 98.41 | 0 | 100/0 |
| PA 19 | 49.71 | 49.3 (93.0 Capro/7.0 HA) | 96.5/3.5 |
| PA 20 | 0 | 98.3 (93.0 Capro/7.0 HA) | 93.1/6.9 |
| PA 21 | 0 | 98.4 (93.0 Capro/7.0 HA) | 93.1/6.9 |
| PA 22 | 0 | 97.1 (93.0 Capro/7.0 HA) | 93.1/6.9 |
| PA 23 | 0 | 97.2 (93.0 Capro/7.0 HA) | 93.1/6.9 |

TABLE 1B

Exemplary polyamide compositions - additive components

| PA Comp. | Capro. Mono. (wt.) | Heat Stab. (wt. %) | UV Stab. 1 (wt. %) | UV Stab. 2 (wt. %) | UV Abs. 1 (wt. %) | Lub. (wt. %) |
|---|---|---|---|---|---|---|
| PA 1 | 1.5 | 0.45 | 0.45 | 0 | 0.3 | 0.37 |
| PA 2 | 1.5 | 0.30 | 0.3 | 0 | 0.2 | 0.37 |
| PA 3 | 1.5 | 0 | 0 | 0.9 | 0 | 0.37 |
| PA 4 | 1.5 | 0 | 0 | 0.6 | 0 | 0.37 |
| PA 5 | 1.5 | 0.3 | 0.3 | 0 | 0.2 | 0.37 |
| PA 6 | 1.5 | 0.3 | 0.3 | 0 | 0.2 | 0.37 |
| PA 7 | 1.5 | 0 | 0 | 0 | 0 | 0.5 |
| PA 8 | 0.3 | 0.1 | 0.6 | 0 | 0.2 | 0.3 |
| PA 9 | 0.3 | 0.1 | 0.9 | 0 | 0.2 | 0.3 |
| PA 10 | 0.3 | 0.1 | 1.2 | 0 | 0.2 | 0.3 |
| PA 11 | 0.3 | 0.1 | 0.6 | 0 | 0 | 0.3 |
| PA 12 | 0.3 | 0.1 | 0.9 | 0 | 0 | 0.3 |
| PA 13 | 0.3 | 0.1 | 1.2 | 0 | 0 | 0.3 |
| PA 14 | 0.3 | 0.1 | 0.9 | 0 | 0 | 0 |
| PA 15 | 0 | 0.19 | 0 | 0 | 0 | 0.3 |
| PA 16 | 0 | 0.10 | 0 | 0 | 0 | 0.3 |
| PA 17 | 0 | 0.19 | 1.2 | 0 | 0 | 0.3 |
| PA 18 | 0 | 0.10 | 1.2 | 0 | 0 | 0.3 |
| PA 19 | 0 | 0.14 | 0.6 | 0 | 0 | 0.3 |
| PA 20 | 1.2 | 0.19 | 0 | 0 | 0 | 0.3 |
| PA 21 | 1.2 | 0.10 | 0 | 0 | 0 | 0.3 |
| PA 22 | 1.2 | 0.19 | 1.2 | 0 | 0 | 0.3 |
| PA 23 | 1.2 | 0.10 | 1.2 | 0 | 0 | 0.3 |

In the Tables 1A and 1B above, "PA Comp." means polyamide composition number. "PA 6 Homopolymer" means the amount of polyamide 6 homopolymer in wt. % based on the weight of the overall polyamide composition. "Capro. Mono." means the amount of caprolactam monomer additive in wt. % based on the weight of the overall polyamide composition. "PA 6/66 Copolymer (Components)" means the amount of polyamide 6/66 copolymer in wt. % based on the weight of the overall polyamide composition, with respective amounts of caprolactam monomer and hexamethylenediamine adipate monomer components in wt. % based on the overall weight of the copolymer. "Total Content of Capro/HA" means the respective amounts of the caprolactam monomer and hexamethylenediamine adipate monomer components in wt. % based on the overall weight of the polyamide composition. "Heat Stab." means amount of heat stabilizer, which is a combination of cuprous oxide and potassium iodide. "UV Stab. 1" means amount of a first UV stabilizer, which is a low molecular weight HALS. "UV Abs. 1" means amount of a first UV absorber, which is an oxanilide type UV absorber. "UV Stab. 2" means amount of a second UV stabilizer, which is a combination of UV Stab. 1, UV Abs. 1, and an antioxidant. "Lub." means amount of lubricant, which was a combination of ethylene bis-stearamide and aluminum stearate.

Example 2

Optical Property Study

Compounded and pelletized materials from Example 1 were next dried at 70° C. in a vacuum oven for 24 hours prior to injection molding. Compounds were molded using an Arburg 320S Allrounder with mold temperature of 38° C. either directly into ASTM D638 Type V microtensile bars or by first molding 1.0 mm thick plaques using an Arburg 320S and Axxicon mold set (60 mm×60 mm×1.0 mm thick) and then punching microtensile bars.

The molded plaques were tested for optical properties using a BYK-Gardner haze gard to measure % Haze and %

Transmittance according to ASTM D1003. The resulting optical properties are presented below in Table 2:

TABLE 2

Optical properties

| PA Comp. | Transmittance (1.0 mm molded plaque) | Haze (1.0 mm molded plaque) | Transmittance (Extruded wire jacket, ca. 6 mil.) | Haze (Extruded wire jacket, ca. 6 mil.) |
|---|---|---|---|---|
| PA 1 | 82.3 | 87.2 | 88.1 | 61.6 |
| PA 2 | 83.5 | 80.5 | 89.1 | 62.6 |
| PA 3 | 75.6 | 96.3 | 88.8 | 64.7 |
| PA 4 | 77.6 | 85.5 | 87.8 | 71.6 |
| PA 5 | 87.3 | 23.5 | 90.3 | 47.7 |
| PA 6 | 84.1 | 20.1 | 90.2 | 55.6 |
| PA 7 | — | — | — | — |
| PA 8 | — | — | 90.7 | 36.8 |
| PA 9 | — | — | 90.9 | 39.2 |
| PA 10 | — | — | 90 | 44.3 |
| PA 11 | — | — | 91 | 38.7 |
| PA 12 | — | — | 90.7 | 34.2 |
| PA 13 | — | — | 91.3 | 31.9 |
| PA 14 | — | — | 91.3 | 31.1 |
| PA 15 | 83.8 | 74 | — | — |
| PA 16 | 84.7 | 67.8 | — | — |
| PA 17 | 86.3 | 35.3 | — | — |
| PA 18 | 87.3 | 39.4 | — | — |
| PA 19 | 88.4 | 18 | — | — |
| PA 20 | 89.6 | 3.7 | — | — |
| PA 21 | 90.4 | 4.3 | — | — |
| PA 22 | 89.5 | 2.0 | — | — |
| PA 23 | 89.6 | 8.4 | — | — |

Based on the compositions in Table 1 and measured optical properties in Table 2 one may see that the criteria of transparency in the present polyamide compositions for wire and cable jacket applications may be improved by replacing part of the polyamide 6 homopolymer with other polyamides with reduced crystallinity relative to the polyamide 6 homopolymer, such as the polyamide 6/66 copolymers disclosed herein. For example, light transmittance (T) was slightly enhanced (>84% T for 1.0 mm plaques, >90% T for 6 mil wire jacket) by addition of other polyamides with reduced crystallinity.

Measured haze (H) values decreased more dramatically, to less than 25% H for 1.1 MM molded plaques and <56% H for 6 mil wire jacket by addition of other polyamides with reduced crystallinity. However, it should be noted that haze values in wire jackets will tend to be somewhat higher as compared to molded plaques due to the roughness of the inside of the wire jacket resulting from the polyamide jacket taking the shape of the underlying insulated cable on to which polyamide jacket is extruded.

Polyamides 15-23 demonstrated more fully the beneficial effects of increasing levels of polyamide 6/66 copolymer in improving optical properties of wire and cable jacket compositions. In these examples, a polyamide 6/66 copolymer is utilized with ~7% HA content at wt/wt loadings of 0%, 49% and 97-98%. These loadings correspond to total HA levels (wt/wt) in the final compositions of 0%, 3.5% and 6.9%. For this data set, the correlation of decreased % haze with higher levels of HA can be shown to be statistically significant by linear regression with $R^2$ value of 0.79 and P value of 0.0013. A similar correlation is observed for % transmission as a function of % HA.

This decrease in haze with addition of increasing levels of HA (via 100% polyamide 6/66 copolymer, or via a blend of polyamide 6/66 copolymer with polyamide 6 homopolymer, may be explained by the disruption of crystallinity that is provided by the HA monomer component which results in less light scattering crystalline moieties.

Exemplary values of haze were demonstrated in 1.0 mm molded plaques of less than 10% haze for total HA level of 6.0%. For polyamide 19 with total HA level of 3.5%, quite acceptable levels of haze of <20% are still achieved.

Polyamides 15, 16, 17, 19, 20, and 22 all demonstrated acceptable UV stability 80% tensile property retention). This demonstrates that UV stability does not correlate to level of HA content, in other words, UV stability of polyamide compositions is independent of total HA level.

Example 3

Mechanical Property Study

The microtensile bars from Example 2 were exposed in a xenon-arc apparatus for 720 hours with exposure according to ASTM G 155, Cycle 1 with pH of water 4.5-8.0. Tensile property retention (Tensile Strength at Break and Elongation at Break) were determined by testing conditioned plaque samples (conditioned to ~2.7% $H_2O$) before and after xenon-arc exposure with a separation rate of 2 inches/minute. For wire jacket material, samples were conditioned at room temperature and 50% relative humidity between 48 and 72 hours before testing. Tensile property % retention was calculated as 100*(Tensile Property following 720 hr UV exposure/Initial Tensile Property).

Tensile properties of the material (ASTM D638) were determined using a molded or punched sample of the above-specified dimensions and cross section by clamping the ends of the specimen with a 1 inch gage length and elongating the specimen at a predetermined rate (2 inches/min) and measuring the resultant force as a function of elongation. The Tensile Strength at Break is equal to the stress (measured force divided by the specimen initial cross sectional area) at the point at or just before sample breakage. The % Elongation at Break is calculated as 100*(specimen length at break/initial length).

The results are presented below in Table 3:

TABLE 3

Mechanical properties

| PA Comp. | Tensile Strength at Break (% Retention Following Xenon-Arc 720 hours Exposure) | Elongation at Break (% Retention Following Xenon-Arc 720 hours Exposure) |
|---|---|---|
| PA 1 | 100.0 | 95.9 |
| PA 2 | 86.9 | 85.1 |
| PA 3 | 97.0 | 90.5 |
| PA 4 | 88.3 | 88.8 |
| PA 5 | 78.4 | 48.4 |
| PA 6 | 91.6 | 93.1 |
| PA 7 | 77.9 | 74.5 |
| PA 8 | — | — |
| PA 9 | — | — |
| PA 10 | — | — |
| PA 11 | — | — |
| PA 12 | — | — |
| PA 13 | — | — |
| PA 14 | — | — |
| PA 15 | 106.0 | 92.4 |
| PA 16 | 100.7 | 86.4 |
| PA 17 | 108.3 | 97.3 |
| PA 18 | 81.3 | 73.4 |
| PA 19 | 92.1 | 82.0 |
| PA 20 | 94.1 | 84.7 |
| PA 21 | 67.4 | 52.3 |
| PA 22 | 104.2 | 99.7 |
| PA 23 | 72.7 | 33.4 |

Assessment of the tensile property retention following 720 hours exposure to UV radiation simulating sunlight demonstrates that polyamides 1-4 and 6, which contained UV stabilizing additives, maintained sufficient tensile property retention 80%) for use in applications such as building wires (example THHN, THWN) rated for use as Sunlight Resistant. Polyamides 1-6 all contained UV additives which were selected based on compatibility with polyamide resins to provide and to decrease the propensity for phase separation leading to reduced haze in final molded plaques or extruded wire jackets. Notably, polyamide 5, containing amorphous polyamide, had a notable decrease in tensile property retention following UV exposure due to the inherent sensitivity of the UV-absorbing aromatic rings to UV degradation. Polyamide 7, without UV stabilizer, also had a reduced level of tensile property retention.

Example 4

Prophetic Example

The polyamide jacket 16 of wire 10 is used to cover core 12 and PVC insulation layer 14 as shown in FIG. 1. A polyamide composition is provided for polyamide jacket 16 in the form of a polyamide 6/66 copolymer formed of caprolactam and an AH salt (hexamethylenediamine adipate (1:1)). The polyamide composition also includes a UV stabilizer such as N,N'-Bis-2,2,6,6-tetramethyl-4-piperidinyl-1,3-benzene dicarboxamide or Nylostab SEED manufactured by Clariant Corporation, additive added to the composition The polyamide composition for polyamide jacket 16 has a relatively low crystallization rate and a relatively low crystallinity as compared to a composition of a polyamide 6 homopolymer. A relatively low crystallization rate during or after extrusion of the polyamide composition yields improved smoothness of the surface of polyamide jacket 16 and also yields improved processability of polyamide jacket 16 relative to a polyamide 6 homopolymer by increasing the temperature processing window for extrusion drawing of polyamide jacket 16. A relatively low crystallinity of the polyamide composition of polyamide jacket 16 exhibits improved transparency such that the jacket 16 can allow for elimination of the color pigment in polyamide jacket 16 and utilize the color pigment in PVC layer 14.

Additionally, the relatively slower crystallization rate and the reduced overall crystallinity results in an improved toughness of polyamide jacket 16 such that the polyamide jacket 16 experiences reduced cracking in certain environments such as during the dry/cool winter months. Furthermore, polyamide jacket 16 has a more stable crystal phase, which includes a substantial content of spherulite crystals, in which the crystal phase will have a relatively large number of relatively small crystals.

With the addition of the UV stabilizer, the polyamide composition for the jacketing shows a greater resistance to the degradation which occurs due to UV-Vis radiation, particularly in the UV-B region.

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

The invention claimed is:
1. A wire product, comprising:
a wire core; and
a polyamide composition surrounding the core, the polyamide composition comprising:
a polyamide base resin including a caprolactam monomer component present in an amount between 75 and 99 wt. % and a hexamethylenediamine adipate monomer component present in an amount between 1 and 25 wt. %, based on the total weight of the polyamide base resin;
at least one UV mitigation component present in an amount of between 0.1 and 6 wt. %, based on the total weight of the polyamide composition; and the polyamide composition further having at least one of:
a measured transmittance of at least 70%, as determined by ASTM D1003; and
a measured haze of less than 60%, as determined by ASTM D1003.
2. The wire product of claim 1, wherein the polyamide base resin includes a caprolactam monomer component present in an amount between 90 and 97 wt. % and a hexamethylenediamine adipate monomer component present in an amount between 3 and 10 wt. %, based on the total weight of the polyamide base resin.
3. The wire product of claim 1, wherein the polyamide composition has a measured transmittance of at least 85%, as determined by ASTM D1003.
4. The wire product of claim 1, wherein the polyamide composition, when formed into a molded plaque having dimensions of 60 mm width, 60 mm length, and 1.0 mm thickness, has a measured haze of less than 30%, as determined by ASTM D1003.
5. The wire product of claim 1, wherein a portion of the polyamide composition, when removed from the wire core, has a measured haze of less than 50%, as determined by ASTM D1003.
6. The wire product of claim 1, wherein the polyamide composition exhibits retention of tensile strength at break of at least 80%, following exposure to 720 hours of Xenon-Arc energy source under conditions specified by ASTM G155 cycle 1.
7. The wire product of claim 1, wherein the polyamide composition exhibits retention of elongation at break of at least 80%, following exposure to 720 hours of Xenon-Arc energy source under conditions specified by ASTM G155 cycle 1.
8. The wire product of claim 1, wherein the at least one UV mitigation component is a UV stabilizer.
9. The wire product of claim 1, wherein the at least one UV mitigation component is a UV absorber.
10. A wire product, comprising:
a wire core; and
a polyamide composition surrounding the core, the polyamide composition comprising:
a polyamide base resin including a polyamide copolymer of caprolactam monomers and hexamethylenediamine adipate monomers, the caprolactam monomers present in an amount between 75 and 99 wt. % and the hexamethylenediamine adipate monomers present in an amount between 1 and 25 wt. %, based on the total weight of the polyamide copolymer;
at least one UV mitigation component present in an amount of between 0.1 and 6 wt. % based on the total weight of the polyamide composition; and the polyamide composition further having at least one of:
- a measured transmittance of at least 70%, as determined by ASTM 01003; and
- a measured haze of less than 60%, as determined by ASTM D1003.

11. The wire product of claim 10, wherein the polyamide base resin is a blend of the polyamide copolymer and a polyamide 6 homopolymer, the polyamide copolymer present in an amount between 5 and 90 wt. % and the polyamide 6 homopolymer present in an amount between 10 and 95 wt. %, based on the total weight of the polyamide base resin.

12. The wire product of claim 10, wherein the caprolactam monomers are present in an amount between 90 and 97 wt. % and the hexamethylenediamine adipate monomers present in an amount between 3 and 10 wt. %, based on the total weight of the polyamide copolymer.

13. The wire product of claim 10, wherein the polyamide composition has a measured transmittance of at least 85%, as determined by ASTM D1003.

14. The wire product of claim 10, wherein the polyamide composition, when formed into a molded plaque having dimensions of 60 mm width, 60 mm length, and 1.0 mm thickness, has a measured haze of less than 30%, as determined by ASTM D1003.

15. The wire product of claim 10, wherein a portion of the polyamide composition, when removed from the wire core, has a measured haze of less than 50%, as determined by ASTM D1003.

16. The wire product of claim 10, wherein the polyamide composition exhibits retention of tensile strength at break of at least 80%, following exposure to 720 hours of Xenon-Arc energy source under conditions specified by ASTM G155 cycle 1.

17. The wire product of claim 10, wherein the polyamide composition exhibits retention of elongation at break of at least 80%, following exposure to 720 hours of Xenon-Arc energy source under conditions specified by ASTM G155 cycle 1.

18. The wire product of claim 10, wherein the at least one UV mitigation component is a UV stabilizer.

19. The wire product of claim 10, wherein the at least one UV mitigation component is a UV absorber.

* * * * *